UNITED STATES PATENT OFFICE.

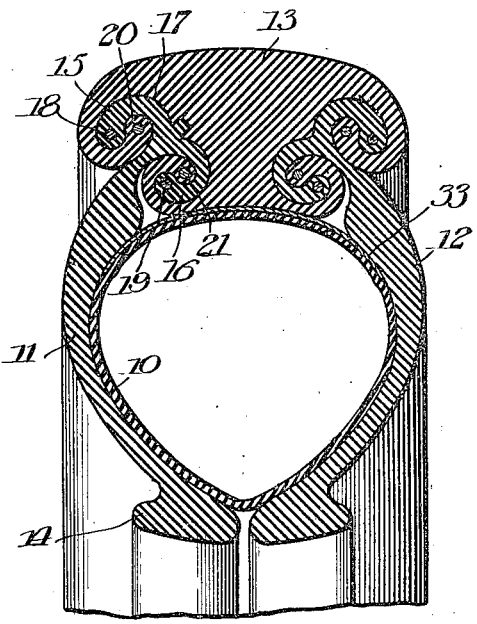
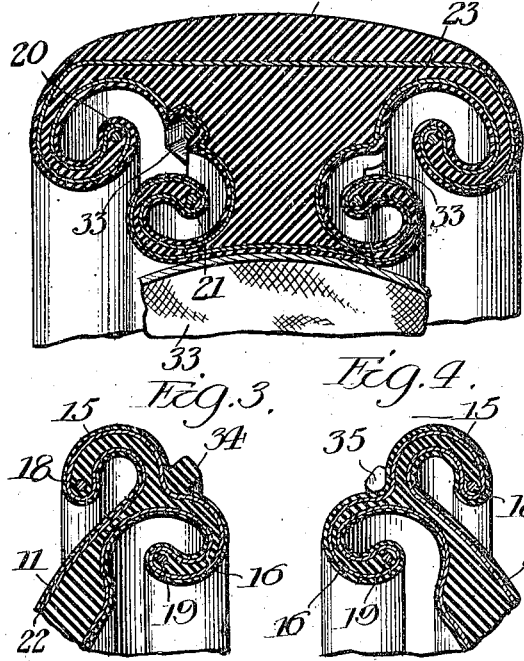

OTTO ZARTH, OF AURORA, ILLINOIS, ASSIGNOR OF ONE-HALF TO WILLIAM H. McCULLOUGH, OF AURORA, ILLINOIS.

REPLACEABLE-TREAD VEHICLE-TIRE.

1,204,109.  Specification of Letters Patent.  Patented Nov. 7, 1916.

Application filed May 28, 1913. Serial No. 770,398.

*To all whom it may concern:*

Be it known that I, OTTO ZARTH, a citizen of the United States, and resident of Aurora, county of Kane, and State of Illinois, have invented certain new and useful Improvements in Replaceable-Tread Vehicle-Tires, of which the following is a specification, and which are illustrated in the accompanying drawings, forming a part thereof.

The invention relates to vehicle tires, and more particularly to those comprising a tubular casing of yielding material and a resilient core.

The object of the invention is to provide a tubular casing of reliable construction in which worn or injured parts may be replaced or renewed.

To this end the invention contemplates a casing composed of a plurality of annular sections with improved means for connecting the sections.

In the accompanying drawings, Figure 1 is a detail sectional view of a pneumatic tire having a casing constructed in accordance with the invention; Figs. 2, 3 and 4 show the several parts of the casing separated from each other; and Fig. 5 is an elevation, partly in section, showing a form of tool which may be used for assembling the parts of the casing.

The improved casing provided by the invention will preferably inclose an annular resilient core, as 10. In the construction shown, this core takes the form of an inflated pneumatic tube. The casing consists of the three annular sections indicated at 11, 12 and 13. Preferably these parts will be so proportioned that when assembled they constitute a tubular inclosure for the core 10, having an external form resembling that of the casing for pneumatic tires now in common use. As shown, the parts 11, 12, of the casing are arranged to form the side walls of the inclosure, and are provided adjacent one edge with a bead or flange 14, constructed for engagement with the rim of a vehicle wheel (not shown) in the usual manner. The annular section 13 is formed to serve as a tread portion of the casing.

In carrying out the invention the sections 11, 12 and 13 of the casing are constructed for detachable connection along their adjacent edges. As shown, each of the side wall portions 11, 12, of the casing is provided at one edge with oppositely extending overturned flanges, as 15, 16. These flanges are preferably so shaped as to impart to each of the sections 11, 12 a T-shape in cross section, with the outer ends of the cross-arm of the T turned downwardly and inwardly. The tread section 13 of the casing is desirably made of greater thickness than either of the side wall sections 11, 12, and has upon each edge an annular groove 17 having a form complementary to that of the T-head of the corresponding side wall sections 11, 12.

To insure a firm connection between the tread 13 and side wall sections 11 and 12 of the casing, continuous rings or bands, as 18, 19, 20 and 21, of wire are extended through the material of the sections adjacent their free edges, as adjacent the ends of the arms 15, 16, of the T-head of each of the side wall sections 11, 12, and adjacent the margins of the side walls of each of the grooves 17 of the tread section 13. These bands or rings permit a sufficient lateral yielding of the parts through which they extend for assembling the sections, but prevent the sections from being disassembled by a direct outward pull, as from the tension produced in the parts by inflating the core 10.

The sections 11, 12 and 13 of the casing may be constructed from any suitable yielding material, a rubber composition with interposed layers of fabric, as 22, 23, such as is ordinarily employed in the construction of the casings for pneumatic tires now in common use, being well adapted for this purpose. In the formation of the tread section 13 of the casing the interposed fabric 23 will preferably extend from side to side of the section adjacent its outer surface to prevent lateral extension of the section. Similarly, the interposed fabric 22 of the side wall sections 11 and 12 will preferably extend continuously through these sections adjacent to and in a line conforming with their surfaces, as most clearly appears in Figs. 3 and 4.

For assembling the parts of the casing a tool constructed to exert inward pressure upon all three of its parts simultaneously will preferably be employed. Such a tool is illustrated in Fig. 5 of the drawings. It comprises a pair of pivotally connected jaws 24, 25, and an intermediate plunger 26. A hand lever 27 is provided for compressing the jaws 24, 25, and advancing the plunger 26. As shown, the hand lever 27 is pivotally connected to one of the jaws, as 24, and carries a roller 28 adapted to bear upon an inclined surface, as 29, of the other jaw. The stem of the plunger 26 is located upon the median plane between the jaws, and is pivotally connected to the hand lever 27. To permit longitudinal adjustment of the plunger 26, its stem is made of two sections, as 30 and 31, and these sections are connected by a turn buckle 32. When the several sections of the casing have been brought to their approximate relative positions of service, the jaws 24, 25, of the tool are caused to span the casing in such manner as to exert inward pressure upon the side wall sections 11 and 12 when the hand lever 27 is depressed. The plunger 26 is thereby brought into engagement with the outer surface of the tread section 13. Continued downward pressure upon the hand lever 27 will cause the T-shaped head of each of the side wall sections 11, 12, to be thrust into the groove at the corresponding margin of the tread section 13. When the parts of the casing have been assembled the assembling tool is released therefrom by raising the hand lever 27.

The invention provides a casing for pneumatic tires and the like, whereby unworn parts of the casing may be used repeatedly in conjunction with renewals of other parts of the casing. As the greater part of the wear during the ordinary use of the tire comes upon its tread, the tread section 13 will be the part most usually replaced. However, either of the side wall sections may be replaced if injured. When the core 10 takes the form of an inflated pneumatic tube, as shown, a fabric shield 33 will preferably be secured against the under side of the tread section 13 to extend laterally at each side of the same. This shield 33 serves to cover the joints which are provided between the outer edges of the side wall sections 11, 12, and the inturned flanges of the tread section 13. Extension of the wall of the inflated tube into such joints is thereby prevented.

In some instances it may be desirable to provide means for preventing relative circumferential movement of the several annular sections of the tire as by a creeping of the tread section 13 with respect to the side wall sections 11 and 12. For this purpose interrupted annular sockets 33 may be provided at the sides of the tread section 13. When this is done the heads of the side wall sections 11 and 12 are provided with tenons, as 34, 35, for entering the sockets 33 at the corresponding side of tread section 13. The several parts of the sockets 33 at the two sides of the tread section 13 are preferably staggered, each part of the socket at one side being located opposite a space intervening between adjacent parts of the socket at the other side of the section.

I claim as my invention,—

1. A pneumatic tire casing comprising side sections and a tread section, the tread section being provided at opposite sides of its tread portion with spaced flaps forming pockets and the side sections having spaced flaps forming pockets, the flaps of the side section fitting into the pockets of the tread section.

2. A pneumatic tire casing comprising side sections and a tread section, the tread section being provided at opposite sides of its tread portion with spaced flaps forming pockets and the side sections having spaced flaps forming pockets, the flaps of the side sections fitting into the pockets of the tread section, the interfitting flaps having interlocking elements.

3. A pneumatic tire casing comprising side sections and a tread section, the tread section being provided at opposite sides of its tread portion with spaced flaps forming pockets and the side sections having spaced flaps forming pockets, the flaps of the side sections fitting into the pockets of the tread section, the interfitting flaps having interlocking ribs and grooves in their contacting faces.

OTTO ZARTH.

Witnesses:
Wm. H. McCullough,
R. H. Burns.

Copies of this patent may be obtained for five cents each, by addressing the "Commissioner of Patents, Washington, D. C."